(12) United States Patent
Chibon et al.

(10) Patent No.: US 12,265,462 B2
(45) Date of Patent: Apr. 1, 2025

(54) MONITORING ACTIVITY OF AN APPLICATION PRIOR TO DEPLOYMENT

(71) Applicant: Red Hat, Inc., Raleigh, NC (US)

(72) Inventors: Pierre-Yves Chibon, Paris la Défense (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 291 days.

(21) Appl. No.: 17/353,053

(22) Filed: Jun. 21, 2021

(65) Prior Publication Data

US 2022/0405188 A1 Dec. 22, 2022

(51) Int. Cl.
*G06F 11/34* (2006.01)
*G06F 11/32* (2006.01)
*G06N 20/00* (2019.01)

(52) U.S. Cl.
CPC ........ *G06F 11/3495* (2013.01); *G06F 11/327* (2013.01); *G06N 20/00* (2019.01)

(58) Field of Classification Search
CPC .. G06F 11/3495; G06F 11/327; G06F 11/302; G06F 11/3466; G06F 2201/865; G06N 20/00

See application file for complete search history.

(56) References Cited

U.S. PATENT DOCUMENTS

| | | | |
|---|---|---|---|
| 6,216,051 B1 * | 4/2001 | Hager, III | G05B 19/0421 700/121 |
| 7,539,980 B1 * | 5/2009 | Bailey | G06F 11/3688 703/22 |
| 8,990,778 B1 | 3/2015 | Allocca et al. | |
| 9,479,526 B1 * | 10/2016 | Yang | G06F 21/554 |
| 10,951,491 B2 | 3/2021 | Brown et al. | |
| 11,093,371 B1 * | 8/2021 | Hicks | G06F 11/3688 |
| 11,321,063 B1 * | 5/2022 | Murthi | G06F 11/3466 |
| 11,341,032 B1 * | 5/2022 | Abrams | G06F 11/3664 |
| 11,350,294 B1 * | 5/2022 | Balmakhtar | H04W 24/04 |
| 11,429,515 B1 * | 8/2022 | Bartling | G06F 11/3692 |
| 11,444,931 B1 * | 9/2022 | Quevedo | H04L 41/50 |

(Continued)

FOREIGN PATENT DOCUMENTS

WO WO-2022228664 A1 * 11/2022

*Primary Examiner* — Matthew M Kim
*Assistant Examiner* — Matthew N Putaraksa
(74) *Attorney, Agent, or Firm* — Dority & Manning, P.A.

(57) ABSTRACT

Monitoring activity of an application prior to deployment is disclosed. A plurality of messages destined for a first application are received. Each message of the plurality of messages is duplicated to create a corresponding plurality of duplicate messages. Each message of the plurality of messages is successively sent to the first application and each duplicate message to a second application. Based on behavior information that identifies behaviors of the first application and the second application, it is determined that a behavior of the second application differs from a behavior of the first application beyond an alert criterion. In response to determining that the behavior of the second application differs from the behavior of the first application beyond the alert criterion, a message is sent to a destination indicating that the behavior of the second application differs from the behavior of the first application, the message identifying the behavior that differs.

20 Claims, 11 Drawing Sheets

(56) References Cited

U.S. PATENT DOCUMENTS

| | | | |
|---|---|---|---|
| 2003/0177442 A1* | 9/2003 | Lou | G06F 40/194 715/234 |
| 2003/0229786 A1* | 12/2003 | Hollis | H04L 63/0442 713/168 |
| 2009/0240759 A1* | 9/2009 | Miyamoto | G06F 11/3419 709/201 |
| 2012/0110279 A1* | 5/2012 | Fredricksen | G06F 16/119 711/E12.001 |
| 2013/0346980 A1* | 12/2013 | Branch | G06F 11/3428 718/100 |
| 2015/0019915 A1* | 1/2015 | Kospiah | G06F 21/566 714/38.1 |
| 2015/0025925 A1* | 1/2015 | Moore | G06Q 10/063 705/7.11 |
| 2015/0254163 A1* | 9/2015 | Baril | G06F 11/3636 714/38.1 |
| 2015/0381465 A1* | 12/2015 | Narayanan | H04L 43/062 709/224 |
| 2016/0173521 A1* | 6/2016 | Yampolskiy | H04L 61/5076 726/25 |
| 2017/0034198 A1* | 2/2017 | Powers | H04L 63/1441 |
| 2017/0097882 A1* | 4/2017 | Chakraborty | G06F 11/3688 |
| 2018/0165184 A1* | 6/2018 | Cochran | G06F 11/3688 |
| 2018/0359336 A1* | 12/2018 | Chattopadhyay | G06F 11/2066 |
| 2019/0114246 A1* | 4/2019 | Sexton | G06F 11/3664 |
| 2020/0183806 A1* | 6/2020 | Lin | G06F 11/3664 |
| 2021/0064509 A1* | 3/2021 | Franke | G06F 11/3664 |
| 2021/0096981 A1* | 4/2021 | Desikachari | G06F 9/466 |
| 2021/0281595 A1* | 9/2021 | Hirano | H04W 4/48 |
| 2021/0349795 A1* | 11/2021 | Sangala | G06F 11/327 |
| 2021/0377288 A1* | 12/2021 | Chen Kaidi | H04L 63/1416 |
| 2021/0389938 A1* | 12/2021 | Kulkarni | G06Q 30/0641 |
| 2021/0406721 A1* | 12/2021 | Pathak | G06N 5/04 |
| 2022/0141192 A1* | 5/2022 | Silveira | H04L 63/20 726/15 |
| 2022/0164424 A1* | 5/2022 | Keith, Jr. | H04L 9/0866 |
| 2022/0210044 A1* | 6/2022 | Rao | H04L 43/50 |
| 2023/0061613 A1* | 3/2023 | Cardozo | G06F 8/71 |
| 2023/0101026 A1* | 3/2023 | Götz | G06F 11/3692 700/19 |

* cited by examiner

MONITORING ACTIVITY OF AN APPLICATION PRIOR TO DEPLOYMENT

BACKGROUND

Complex software products increasingly rely on underlying technologies, sometimes referred to as dependencies, that are developed by third parties.

SUMMARY

The examples disclosed herein implement mechanisms for monitoring activity of an application prior to deployment. Messages that are directed to a production application are duplicated and also sent to a pre-production application. Behavior of the production application and the pre-production are then monitored. If a deviation in behavior between the pre-production application and the production application is sufficiently substantial, an alert may be sent to a destination with information identifying the deviation in behavior so that the pre-production application can be further analyzed.

In one implementation a method is provided. The method includes receiving a plurality of messages destined for a first application over a period of time. The method further includes duplicating each message of the plurality of messages to create a corresponding plurality of duplicate messages. The method further includes successively sending each message of the plurality of messages to the first application and each duplicate message to a second application. The method further includes determining, based on behavior information that identifies behaviors of the first application and the second application over the period of time, that a behavior of the second application differs from a behavior of the first application beyond an alert criterion. The method further includes, in response to determining that the behavior of the second application differs from the behavior of the first application beyond the alert criterion, sending, to a destination, a message indicating that the behavior of the second application differs from the behavior of the first application, the message identifying the behavior of the second application that differs.

In another implementation a computer system is provided. The computer system includes a processor device set including one or more processor devices of one or more computing devices. The processor device set is to receive a message destined for a first application. The processor device set is further to duplicate the message to create a duplicate message. The processor device set is further to send the message to the first application and the duplicate message to a second application. The processor device set is further to determine, based on behavior information that identifies behaviors of the first application and the second application in response to the message and the duplicate message, that a behavior of the second application differs from a behavior of the first application beyond an alert criterion. The processor device set is further to, in response to determining that the behavior of the second application differs from the behavior of the first application beyond the alert criterion, send, to a destination, a message indicating that the behavior of the second application differs from the first application, the message identifying the behavior that differs.

In another implementation a non-transitory computer-readable storage medium is provided. The non-transitory computer-readable storage medium includes executable instructions to cause a processor device set comprising one or more processor devices to receive a plurality of messages destined for a first application over a period of time. The executable instructions further cause the processor device set to duplicate each message of the plurality of messages to create a corresponding plurality of duplicate messages, wherein each duplicate message corresponds to one of the plurality of messages. The executable instructions further cause the processor device set to send each message of the plurality of messages to the first application and each duplicate message to a second application. The executable instructions further cause the processor device set to determine that a behavior of the second application differs from a behavior of the first application beyond an alert criterion, and, in response to determining that the behavior of the second application differs from the behavior of the first application beyond the alert criterion, send, to a destination, a message indicating that the behavior of the second application differs from the behavior of the first application, the message identifying the behavior of the second application that differs.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
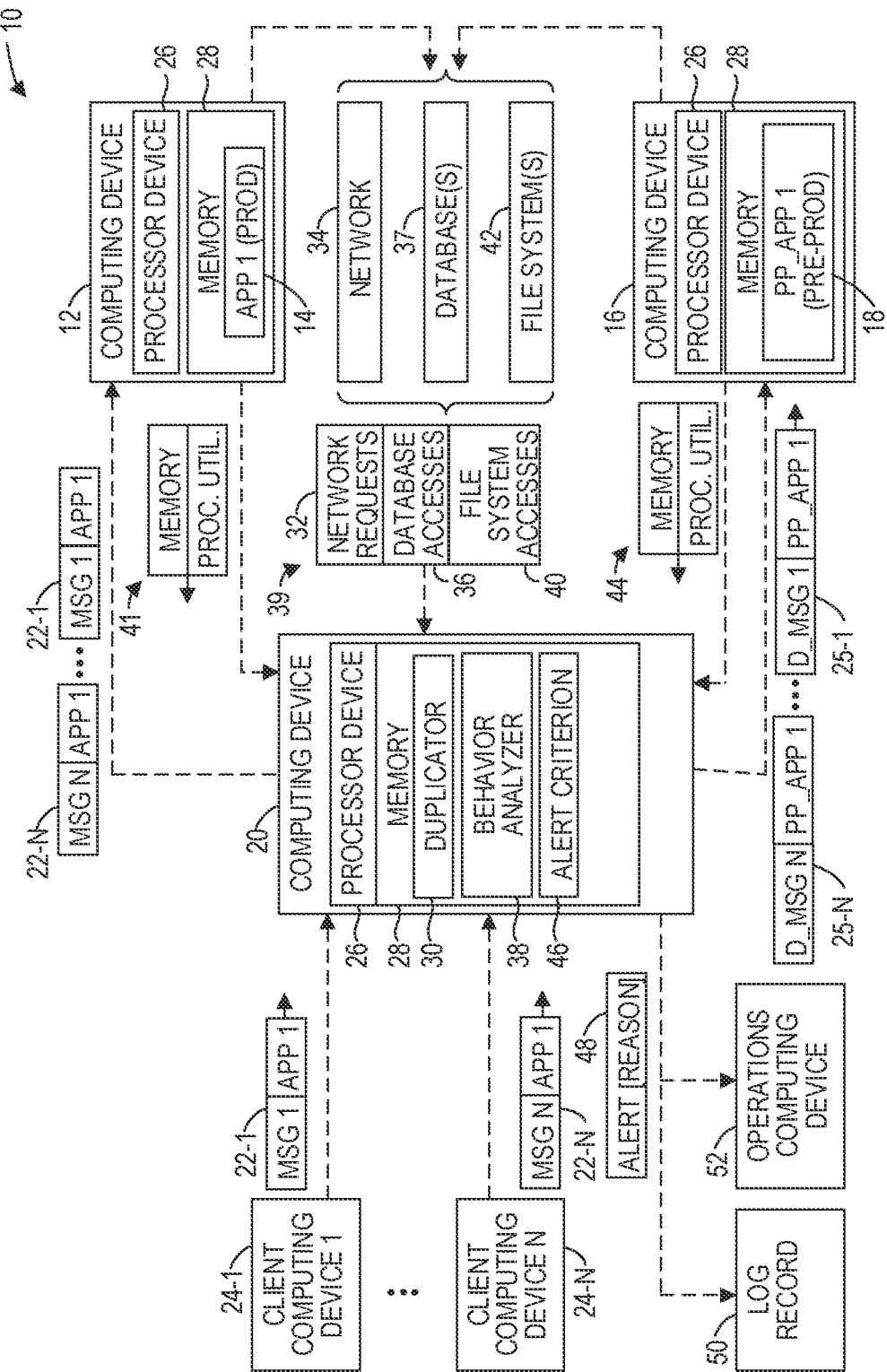
FIG. 1 is a block diagram of an environment in which examples of monitoring activity of an application prior to deployment can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Complex software products increasingly rely on underlying technologies, sometimes referred to as dependencies, that are developed by third parties. A software manufacturer may have little insight into the security implemented by a third party and thus risks incorporating dependencies from third parties that may have been compromised by a nefarious entity. This may be particularly true where the dependency can potentially be modified by a large number of individuals, such as in the case of open source software. Even if the software manufacturer has access to the source code of the dependency, the technological complexity and/or size of a dependency may inhibit or prevent the software manufacturer from meaningfully analyzing the dependency prior to using the dependency. Moreover, some dependencies are provided in executable form only, thus making any analysis of the dependency impracticable or impossible.

The examples disclosed herein implement mechanisms for monitoring activity of an application prior to deployment. Messages that are directed to a production application are duplicated and also sent to a pre-production application. Behavior of the production application and the pre-production are then monitored. The behavior may include network activity, file system activity, database activity, processing and/or memory activity, or the like. If a deviation in behavior between the pre-production application and the production application is sufficiently substantial, an alert may be sent to a destination with information identifying the deviation in behavior so that the pre-production application can be further analyzed. Among other advantages, the examples disclosed herein greatly limit a likelihood of implementing, in a production environment, an application that has been compromised by a nefarious entity or otherwise programmed to implement functionality that is unexpected and/or undesired.

FIG. 1 is a block diagram of an environment 10 in which examples can be practiced. The environment 10 includes a computing device 12 on which a production application 14 executes. The environment 10 also includes a computing device 16 on which a pre-production application 18 executes. The pre-production application 18 is a revised version of the production application 14. The pre-production application 18 may have been revised to enhance the functionality of the production application 14, to reduce functionality of the production application 14, to fix software "bugs" identified in the production application 14, or for any number of other reasons. In some software deployment models, the production application 14 may be referred to as a "green" version and the pre-production application 18 may be referred to as a "blue" version. In such deployment models, the "blue" version may, if deemed to operate as intended, eventually replace the "green" version and become the "green" production application.

A computing device 20 receives a plurality of messages 22-1-22-N (generally, messages 22) from one or more actual or simulated computing devices 24-1-24-N that are destined for the application 14. The messages 22 are messages suitable for the function of the application 14. For example, if the application 14 is a web server application, the messages may comprise queries for products, requests to purchase a product, or any other message related to a function of the web server application.

All of the computing devices illustrated in FIG. 1 may include one or more processor devices 26 and one or more memories 28. A duplicator 30 duplicates (e.g., makes a copy of) each of the messages 22-1-22-N, to create a corresponding plurality of duplicate messages 25-1-25-N (generally, duplicate messages 25). The computing device 20 then successively sends each of the messages 22 to the production application 14 and the duplicate messages 25 to pre-production application 18. The computing device 20 may send the messages 22 and duplicate messages 25 in pairs of corresponding messages to the production application 14 and the pre-production application 18. For example, the computing device 20 may, substantially concurrently, send the message 22-1 to the production application 14 and the duplicate message 25-1, which is a duplicate of the message 22-1, to the pre-production application 18. After the production application 14 has processed the message 22-1 and the pre-production application 18 has processed the duplicate message 25-1, the computing device 20 may, substantially concurrently, send the message 22-2 to the production application 14 and the duplicate message 25-2 to the pre-production application 18.

The production application 14 receives the message 22-1 and exhibits various behaviors in response to the message 22-1. The behaviors may include one or more network requests 32 made via a network 34. A network request 32 is a message sent to a destination using a network address, such as a media access control (MAC) or internet protocol (IP) address, via a network 34. The behaviors may also include one or more database accesses 36 made to one or more databases 37. A database access 36 is an access of the database 37, such as a read access or a write access of the database 37. The behaviors may also include one or more file system accesses 40 of one or more file systems 42. A file system access 40 is an access, such as a read, write, deletion, or addition of a file maintained by the file system 42. A single action may constitute multiple different types of behaviors. For example, a database access 36 or a file system access 40 may be made via a network request 32.

A behavior analyzer 38 obtains behavior information 39 that identifies the behaviors of the production application 14. In particular, the behavior analyzer 38 obtains behaviors such as the network requests 32, database accesses 36, and file system accesses 40 made by the production application 14 in response to the receipt of the message 22-1. The behavior analyzer 38 may also obtain from the computing device 12 behaviors such as real time usage metrics 41, such as memory utilization of the production application 14, periodically, intermittently, and/or at specific times, such as immediately prior to sending the message 22-1 to the production application 14, during the processing of the message 22-1 by the production application 14, and immediately after the processing of the message 22-1 by the production application 14.

The behavior analyzer 38 may identify the network requests 32 in any number of ways. An application executing on the computing device 12 may monitor a network stack of the computing device 12 and send information to the behavior analyzer 38 that identifies the network requests 32 made by the production application 14. In other implementations, the behavior analyzer 38 may interact with a network analysis program, such as Wireshark®, or the like, that inspects packet traffic on the network 34 in real time, to obtain the network packets transmitted by the production application 14.

The behavior analyzer 38 may also identify the database accesses 36 in any number of ways. In some implementations, network packets directed to the database 37 may be examined. In some implementations, the database 37 may implement an application programming interface (API) that provides information regarding the database accesses 36. In some implementations log records generated by the database 37 may be examined to determine the database accesses 36.

The behavior analyzer 38 may also identify the file system accesses 40 in any number of ways. In some implementations, a file system module executing on the computing device 12 may monitor file system accesses 40 of the production application 14 and send information to the behavior analyzer 38 that identifies the file system accesses 40 made by the production application 14.

The behavior analyzer 38 also obtains behavior information 39 that identifies the behaviors of the pre-production application 18. In particular, the behavior analyzer 38 obtains the network requests 32, database accesses 36 and file system accesses 40 made by the pre-production application 18 in response to the receipt of the message 25-N. The behavior analyzer 38 may also obtain from the computing device 16, real time usage metrics 44, such as memory utilization of the pre-production application 18, periodically, intermittently, and/or at specific times, such as immediately prior to sending the message 25-N to the pre-production application 18, during the processing of the message 25-N by the pre-production application 18, and immediately after the processing of the message 25-N by the pre-production application 18.

The behavior analyzer 38 determines whether a behavior of the pre-production application 18 differs from the behavior of the production application 14 beyond an alert criterion 46. In this implementation, the alert criterion 46 comprises one or more criteria that identify when an alert 48 should be sent to a destination, such as a log record 50, operations computing device 52, or the like. The criteria may be any desired criterion or criteria related to processor utilization, memory utilization, network requests 32, database accesses 36 and/or file system accesses 40, or any combination thereof.

By way of non-limiting examples, the alert criterion 46 may comprise a 1.5× processor time utilization to process the same message. For example, if the pre-production application 18 takes less than one and one half times the processor time to process the duplicate message 25-1 than it took the production application 14 to process the message 22-1, then the behavior of the pre-production application 18 does not differ beyond the alert criterion 46. If, however, the pre-production application 18 takes two times the processor time to process the duplicate message 25-1 than it took the production application 14 to process the message 22-1, then the behavior of the pre-production application 18 does differ beyond the alert criterion 46 and the behavior analyzer 38 sends the alert 48 to one or more destinations. The alert 48 may indicate that the behavior of the pre-production application 18 differs from the behavior of the production application 14, and identify the particular behavior, in this example, twice the processor time to process the same message.

As additional non-limiting examples of the alert criterion 46, the following alert criteria may be established:

issuing a greater number of database accesses 36 than issued by the production application 14;

issuing a greater number of database delete accesses 36 than issued by the production application 14;

issuing a greater number of database read accesses 36 than issued by the production application 14;

connecting to a different database 37 than connected to by the production application 14;

issuing a different number of database connections than issued by the production application 14;

issuing a network request 32 to an IP address or domain name not accessed by the production application 14;

issuing a network request 32 to a particular IP address without making a domain name system (DNS) request to obtain the IP address;

issuing a file system access 40 to a different file than accessed by the production application 14;

issuing more file system read or write accesses 40 than issued by the production application 14;

generating a file in the file system 42 that was not generated by the production application 14;

deleting a file in the file system 42 that was not deleted by the production application 14;

issuing a network request 32 to a server in a geographic region not accessed by the production application 14;

issuing a network request 32 to a server in a predetermined geographic region;

issuing a greater number of network requests 32 than issued by the production application 14;

issuing a network request 32 that was not issued by the production application 14; and issuing a network request 32 that is a connection to a server that is not issued by the production application 14.

The alert criterion 46 may be any single criterion or any combination of criteria. The behavior analyzer 38 may compare the behavior of the production application 14 and the pre-production application 18 for a particular message 22 and corresponding duplicate message 25, and/or over a period of time for a plurality of messages 22 and corresponding plurality of duplicate messages 25. For example, the alert criterion 46 may indicate that the pre-production application 18 may issue no more than five additional network requests 32 than are issued by the production application 14 within the span of three messages 22 and three corresponding duplicate messages 25.

The behavior analyzer 38 may, immediately prior to sending a message 22 to the production application 14, send a message to the computing device 12 that instructs the computing device 12 to store information regarding each network request 32, database access 36, and file system access 40 of the production application 14. The behavior analyzer 38 may also, immediately prior to sending the corresponding duplicate message 25 to the pre-production application 18, send a message to the computing device 16 that instructs the computing device 16 to store information regarding each network request 32, database access 36, and file system access 40 of the pre-production application 18.

The behavior analyzer 38 may then, substantially concurrently, send the message 22 to the production application 14 and the duplicate message 25 to the pre-production application 18. After a predetermined period of time, such as 500 milliseconds, one second, five seconds, or the like, and prior to sending an additional message 22 to the production application 14 or additional duplicate message 25 to the pre-production application 18, the behavior analyzer 38 may request from the computing device 12 the information regarding each network request 32, database access 36 and file system access 40 made by the production application 14. The behavior analyzer 38 may also request from the computing device 16 the information regarding each network request 32, database access 36, and file system access 40 made by the pre-production application 18. The behavior analyzer 38 may then compare the behavior and determine whether or not the behavior differs beyond an alert criterion 46.

The behavior analyzer 38 may also compare the behavior of the production application 14 and the pre-production application 18 independently of any messages 22 and corresponding duplicate messages 25. For example, an alert criterion 46 may indicate that an alert 48 should be sent to a destination if the memory utilization of the pre-production application 18 exceeds two times the memory utilization of the production application 14, or if the pre-production application 18 issues network requests 32, database accesses 36, and/or file system accesses 40 not issued by the production application 14 even in the absence of processing any duplicate messages 25.

It is noted that because the duplicator 30 and the behavior analyzer 38 are components of the computing device 20, functionality implemented by the duplicator 30 or the behavior analyzer 38 may be attributed to the computing device 20 generally. Moreover, in examples where the duplicator 30 and the behavior analyzer 38 comprise software instructions that program the processor device 26 to carry out functionality discussed herein, functionality implemented by the duplicator 30 and/or the behavior analyzer 38 may be attributed herein to the processor device 26.

It is further noted that while the duplicator 30 and the behavior analyzer 38 are shown as separate components, in other implementations, the duplicator 30 and the behavior analyzer 38 could be implemented in a single component or could be implemented in a greater number of components than two. It is also noted that while, for purposes of illustration and simplicity, the examples are illustrated as being implemented by a processor device set that includes the single processor device 26 on the single computing device 20, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2:
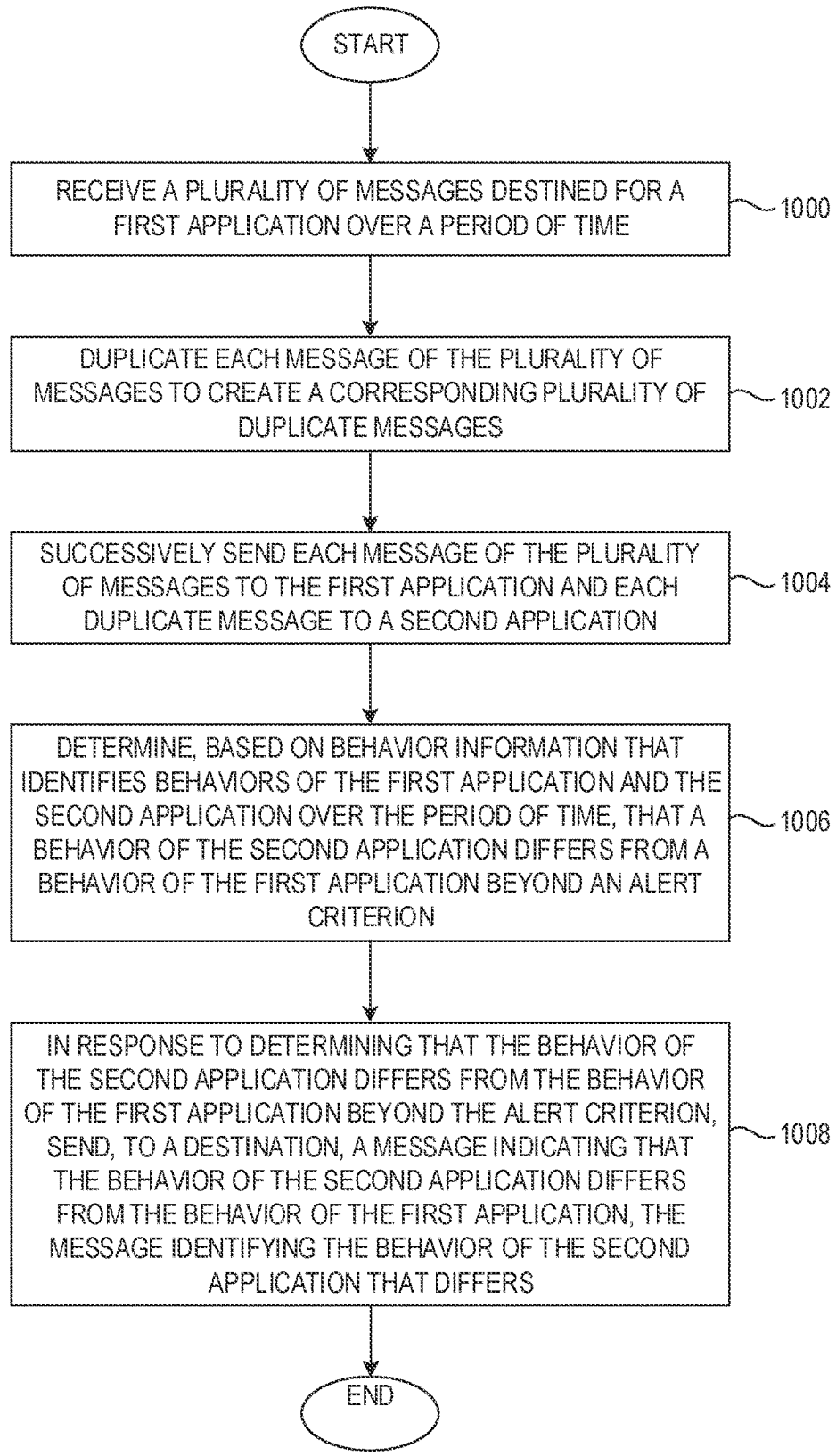
FIG. 2 is a flowchart of a method for monitoring activity of an application prior to deployment according to one implementation.

FIG. 2 is a flowchart of a method for monitoring activity of an application prior to deployment according to one implementation. FIG. 2 will be discussed in conjunction with FIG. 1. The computing device 20 receives a plurality of messages 22 destined for the production application 14 over a period of time (FIG. 2, block 1000). The computing device 20 duplicates each message 22 of the plurality of messages 22 to create the corresponding plurality of duplicate messages 25 (FIG. 2, block 1002). The computing device 20 successively sends each message 22 of the plurality of messages 22 to the production application 14 and each duplicate message 25 to the pre-production application 18 (FIG. 2, block 1004).

The computing device 20 determines, based on the behavior information 39 that identifies behaviors of the production application 14 and the pre-production application 18 over the period of time, that a behavior of the pre-production application 18 differs from a behavior of the production application 14 beyond an alert criterion 46 (FIG. 2, block 1006). The computing device 20, in response to determining that the behavior of the pre-production application 18 differs from the behavior of the production application 14 beyond the alert criterion 46, sends, to a destination, the alert 48 indicating that the behavior of the pre-production application 18 differs from the production application 14, the alert 48 identifying the behavior of the pre-production application 18 that differs (FIG. 2, block 1008).

Figure 3:
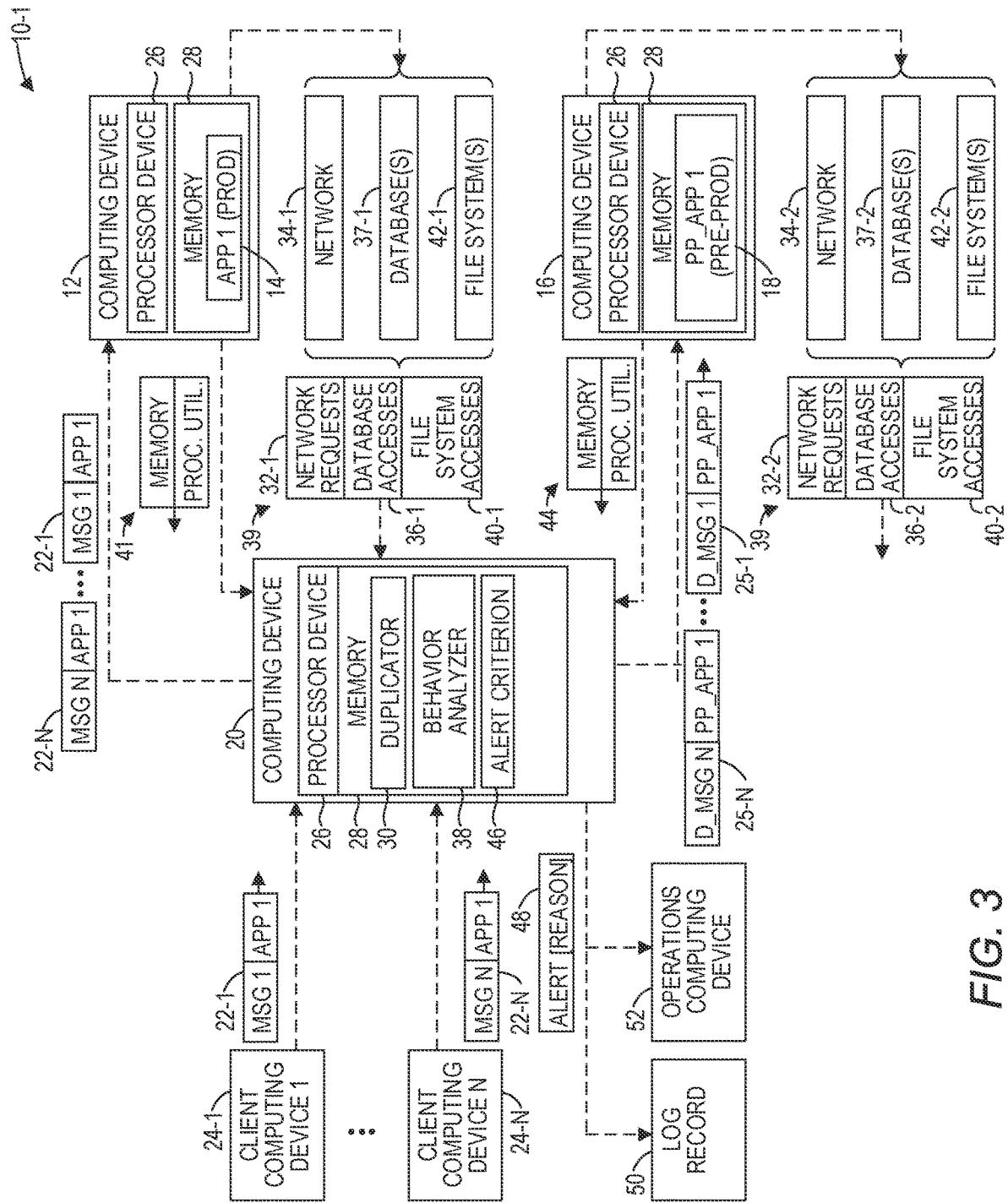
FIG. 3 is a block diagram of an environment in which examples of monitoring activity of an application prior to deployment can be practiced according to another implementation.

FIG. 3 is a block diagram of an environment 10-1 according to another implementation. The environment 10-1 is substantially similar to the environment 10 except as otherwise noted herein. In the environment 10-1, the production application 14 receives messages 22 and implements certain behaviors utilizing a network 34-1, one or more databases 37-1, and one or more file systems 42-1. The behaviors may include one or more network requests 32-1 made via the network 34-1, one or more database accesses 36-1 made to one or more of the databases 37-1, and one or more file system accesses 40-1 of the one or more file systems 42-1.

The pre-production application 18 receives duplicate messages 25 and implements certain behaviors utilizing a duplicate environment to that utilized by the production application 14. In particular, the pre-production application 18 implements certain behaviors utilizing a network 34-2, one or more databases 37-2 which are duplicates of the one or more databases 37-1, and one or more file systems 42-2, which are duplicates of the one or more file systems 42-1. The behaviors may include one or more network requests 32-2 made via the network 34-2, one or more database accesses 36-2 made to one or more of the databases 37-2, and one or more file system accesses 40-2 of the one or more file systems 42-2.

The behavior analyzer 38 determines whether a behavior of the pre-production application 18 differs from the behavior of the production application 14 beyond an alert criterion 46, as discussed above with regard to FIG. 1. The environment 10-1 may be useful where it is desired to prevent the pre-production application 18 from manipulating, changing, or otherwise accessing a production environment utilized by the production application 14, or causing duplicate behavior from occurring due to the production application 14 and the pre-production application 18 accessing the same databases and file systems.

Figure 4:
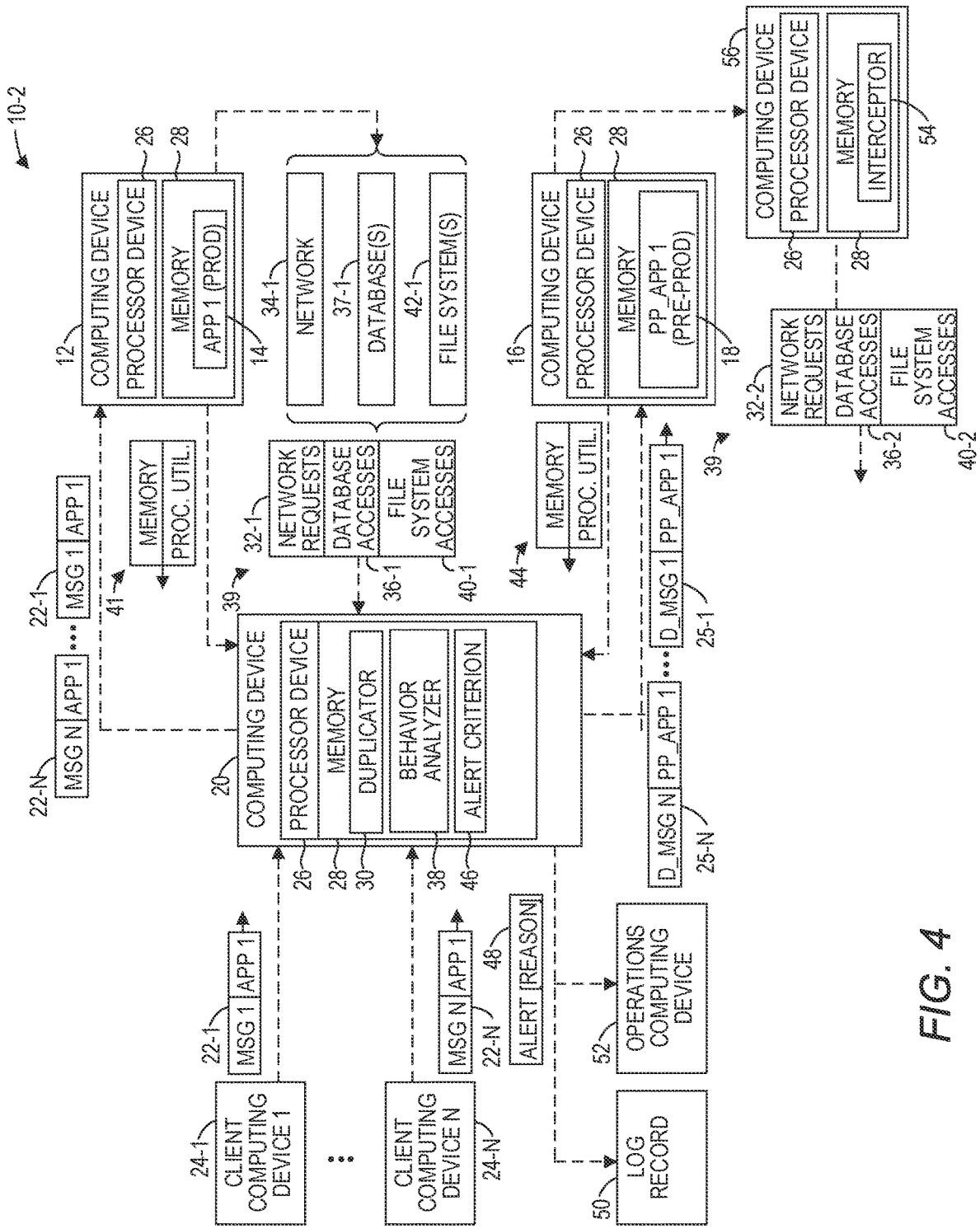
FIG. 4 is a block diagram of an environment in which examples of monitoring activity of an application prior to deployment can be practiced according to yet another implementation.

FIG. 4 is a block diagram of an environment 10-2 according to another implementation. The environment 10-2 is substantially similar to the environment 10 except as otherwise noted herein. In the environment 10-2, the production application 14 receives messages 22 and implements certain behaviors utilizing the network 34-1, one or more databases 37-1, and one or more file systems 42-1. The behaviors may include one or more network requests 32-1 made via the network 34-1, one or more database accesses 36-1 made to one or more of the databases 37-1, and one or more file system accesses 40-1 of the one or more file systems 42-1.

The pre-production application 18 receives duplicate messages 25 and initiates certain behaviors, such as network requests 32-2, one or more database accesses 36-2, and one or more file system accesses 40-2. However, such behaviors are intercepted by an interceptor 54 executing on a computing device 56. The interceptor 54 may return information to the pre-production application 18 such that the pre-production application 18 is unaware that the behaviors have been intercepted by the interceptor 54. The interceptor 54 reports, to the behavior analyzer 38, the network requests 32-2, the one or more database accesses 36-2, and the one or more file system accesses 40-2 initiated by the pre-production application 18.

The behavior analyzer 38 determines whether a behavior of the pre-production application 18 differs from the behavior of the production application 14 beyond an alert criterion 46, as discussed above with regard to FIG. 1. The environment 10-2 is another implementation that may be useful where it is preferable not to have to duplicate the environment in which the production application 14 operates, and which prevents the pre-production application 18 from manipulating, changing, or otherwise accessing a production environment utilized by the production application 14, or causing duplicate behavior from occurring due to the production application 14 and the pre-production application 18 accessing the same databases and file systems.

Figure 5:
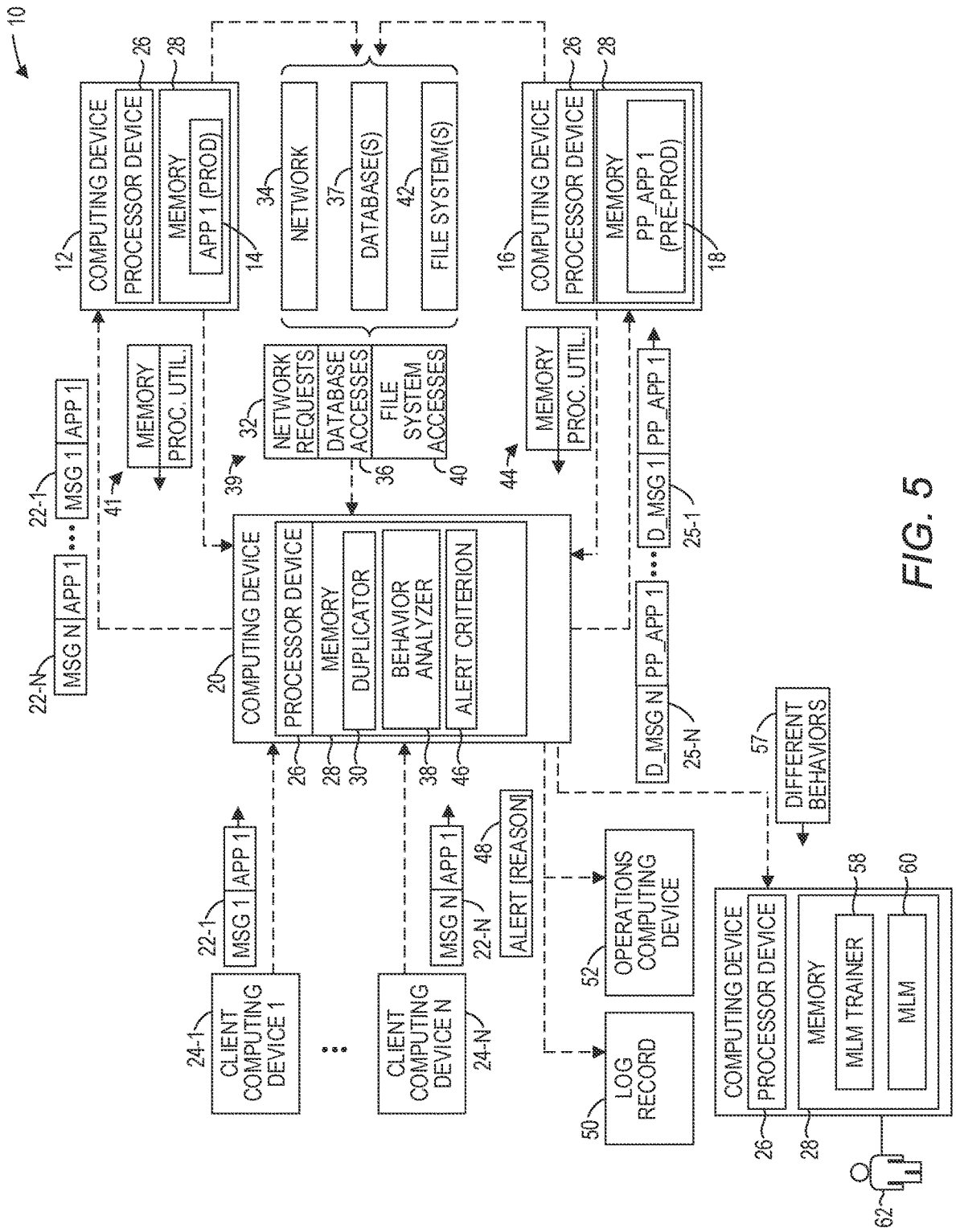
FIG. 5 is a block diagram of the environment illustrated in FIG. 1 with additional features for monitoring activity of an application prior to deployment according to another implementation.

FIG. 5 is a block diagram of the environment illustrated in FIG. 1 with additional features for monitoring activity of an application prior to deployment according to another implementation. In this implementation, the behavior analyzer 38 sends information that identifies different behaviors 57 of the pre-production application 18 to a machine learning model (MLM) trainer 58. The MLM trainer 58 trains an MLM 60 by inputting the different behaviors 57 to the MLM 60 and identifying whether each different behavior 57 is a permissible different behavior 57 or an impermissible different behavior 57. An operator 62 may participate in the training and identifying which different behaviors 57 are permissible and which are not, and thus differ beyond an alert criterion. The use of the MLM 60 may be beneficial because revised versions of the production application 14 may implement new functionality that causes a difference in behavior that is permissible and expected.

The production application 14 may be revised repeatedly over time, each revision constituting a new version of the production application 14, and each new version may implement new functionality that causes a difference in behavior compared to the previous version; however, such differences may be expected and not problematic. The MLM 60 is trained over a period of time that encompasses the analysis of multiple new versions of the production application 14. The MLM 60 thus is provided, over time, information via which the MLM 60 can determine whether a difference in behavior is likely a problem or not based on the differences in behavior that were problems and those that were not in previous new versions of the production application 14.

Figure 6:
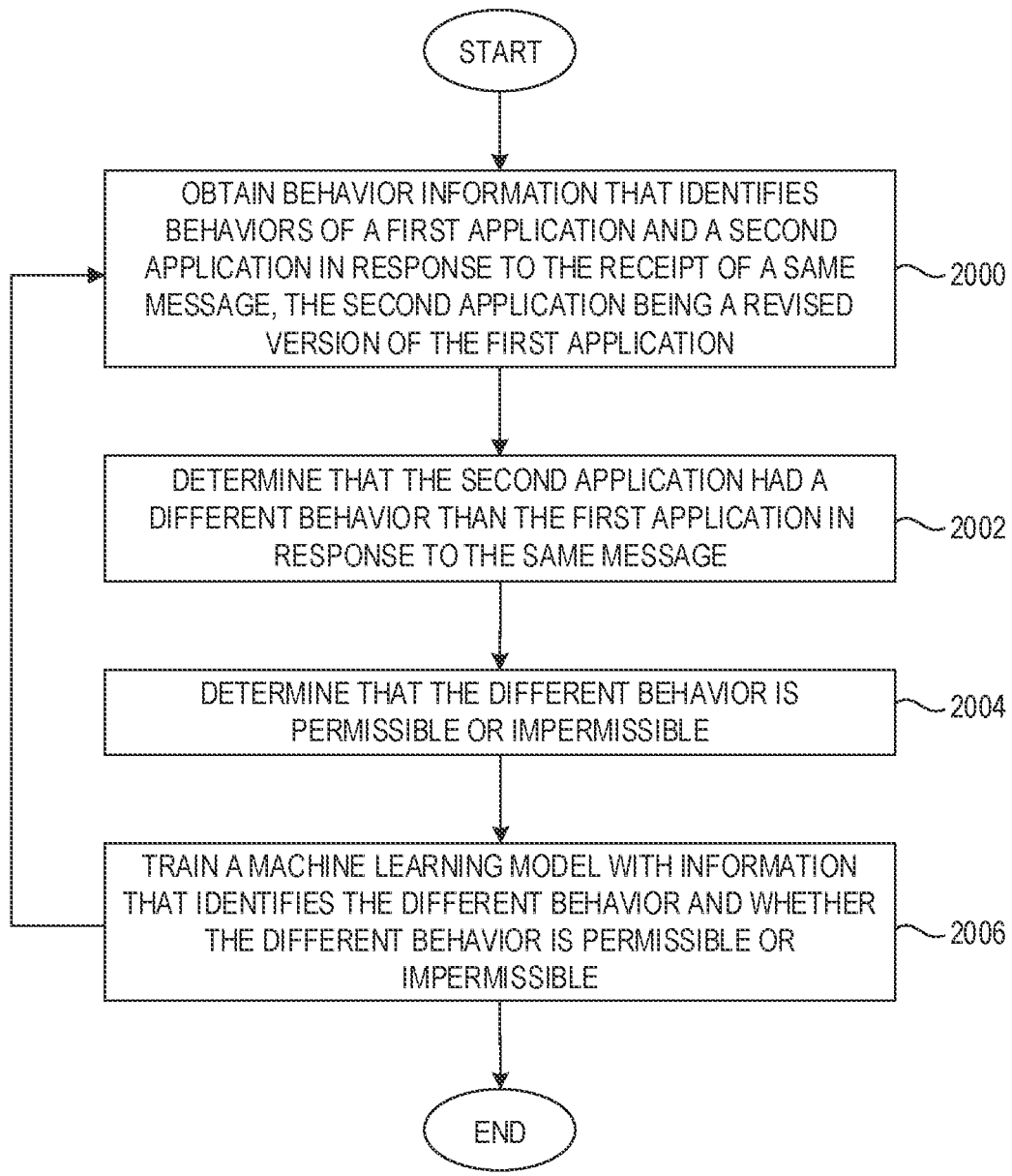
FIG. 6 is a flowchart of a method for training a machine learning model according to one implementation.

FIG. 6 is a flowchart of a method for training the MLM 60 according to one implementation. FIG. 6 will be discussed in conjunction with FIG. 5. The behavior analyzer 38 obtains the behavior information 39 that identifies behaviors of the production application 14 and the pre-production application 18 in response to the receipt of a same message 22, 25 the pre-production application 18 being a revised version of the production application 14 (FIG. 6, block 2000). The behavior analyzer 38 determines that the pre-production application 18 had a different behavior than the production application 14 in response to the same message 22, 25 (FIG. 6, block 2002). The MLM trainer 58 receives the different behaviors 57 and determines that the different behavior is permissible or impermissible (FIG. 6, block 2004). The MLM trainer 58 trains the MLM 60 with information that identifies the different behavior and whether the different behavior is permissible or impermissible (FIG. 6, block 2006).

Figure 7:
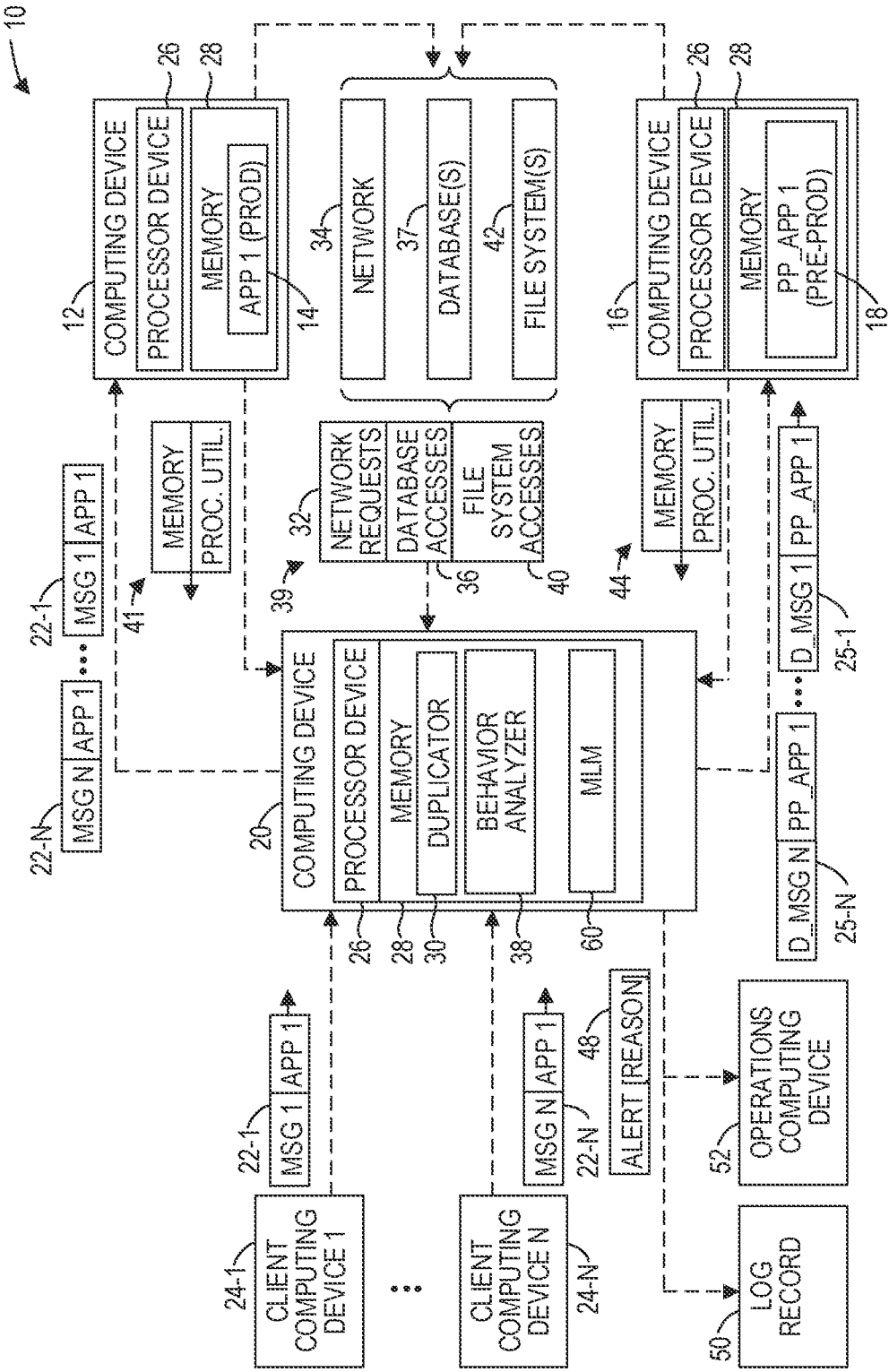
FIG. 7 is a block diagram of the environment illustrated in FIG. 1 according to another implementation.

FIG. 7 is a block diagram of the environment illustrated in FIG. 1 according to another implementation. In this implementation, the behavior analyzer 38 obtains the behavior information 39 that identifies the behaviors of the production application 14 and the pre-production application 18. The behavior analyzer 38 determines the differences in the behaviors of the production application 14 and the pre-production application 18. The behavior analyzer 38 inputs the difference in behaviors to the MLM 60. The MLM 60 outputs information that directly or indirectly determines whether the difference in behaviors is beyond an alert criterion. In some implementations, the MLM 60 may simply output a value, such as true or false as to whether the difference in behaviors is beyond the alert criterion. In other implementations, the MLM 60 may output a probability value that the differences in behavior constitute a problem or not. The behavior analyzer 38 may compare the probability value to a threshold value, such as 60, 70, or the like, and if so, conclude that the differences in behavior are beyond the alert criterion.

Figure 8:
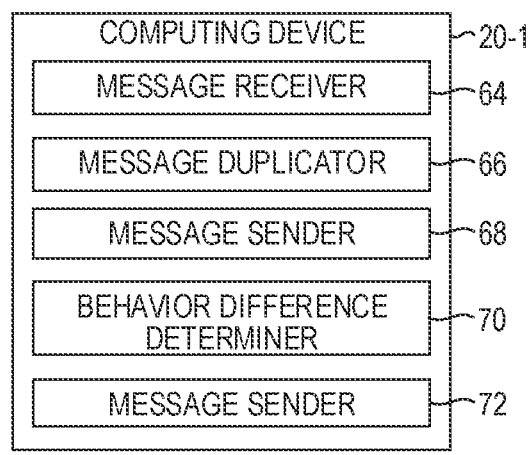
FIG. 8 is a block diagram of a computing device suitable for implementing aspects illustrated herein according to one implementation.

FIG. 8 is a block diagram of a computing device 20-1 according to another implementation. The computing device 20-1 implements identical functionality as that described above with regard to the computing device 20. The computing device 20-1 includes a message receiver 64 to receive a plurality of messages destined for a first application over a period of time. The message receiver 64 may comprise executable software instructions configured to program a processor device to implement the functionality of receiving a plurality of messages destined for a first application over a period of time, may comprise circuitry including, by way of non-limiting example, an application-specific integrated circuit (ASIC), field-programmable gate array (FPGA), or may comprise a combination of executable software instructions and circuitry. The message receiver 64 may receive actual messages generated by a plurality of different users in a real-world production environment, and/or may receive messages generated by a message simulator for the purposes of testing a second application. In some implementations, the message receiver 64 is a proxy, and messages directed toward the first application are automatically directed to the message receiver 64 instead.

The computing device 20-1 also includes a message duplicator 66 to duplicate each message of the plurality of messages to create a corresponding plurality of duplicate messages. The message duplicator 66 may copy each message to generate the plurality of duplicate messages. The message duplicator 66 may comprise executable software instructions configured to program a processor device to implement the functionality of duplicating each message of the plurality of messages to create a corresponding plurality of duplicate messages, may comprise circuitry including, by way of non-limiting example, an ASIC, FPGA, or may comprise a combination of executable software instructions and circuitry.

The computing device 20-1 also includes a message sender 68 to successively send each message of the plurality of messages to the first application and each duplicate message to the second application. The message sender 68 may comprise executable software instructions to program a processor device to implement the functionality of successively sending each message of the plurality of messages to the first application and each duplicate message to the second application, may comprise circuitry including, by way of non-limiting example, an ASIC, FPGA, or may comprise a combination of executable software instructions and circuitry.

The computing device 20-1 also includes a behavior difference determiner 70 that is to determine, based on behavior information that identifies behaviors of the first application and the second application over the period of time, that a behavior of the second application differs from a behavior of the first application beyond an alert criterion. The behavior difference determiner 70 may comprise executable software instructions to program a processor device to implement the functionality of determining, based on behavior information that identifies behaviors of the first application and the second application over the period of time, that a behavior of the second application differs from a behavior of the first application beyond an alert criterion, may comprise circuitry including, by way of non-limiting example, an ASIC, FPGA, or may comprise a combination of executable software instructions and circuitry.

The computing device 20-1 also includes a message sender 72 that is to, in response to determining that the behavior of the second application differs from the behavior of the first application beyond the alert criterion, send, to a destination, a message indicating that the behavior of the second application differs from the first application, the message identifying the behavior that differs. The message sender 72 may comprise executable software instructions to program a processor device to implement the functionality of, in response to determining that the behavior of the second application differs from the behavior of the first application beyond the alert criterion, send, to a destination, a message indicating that the behavior of the second application differs from the first application, the message identifying the behavior that differs, may comprise circuitry including, by way of non-limiting example, an ASIC, FPGA, or may comprise a combination of executable software instructions and circuitry.

Figure 9:
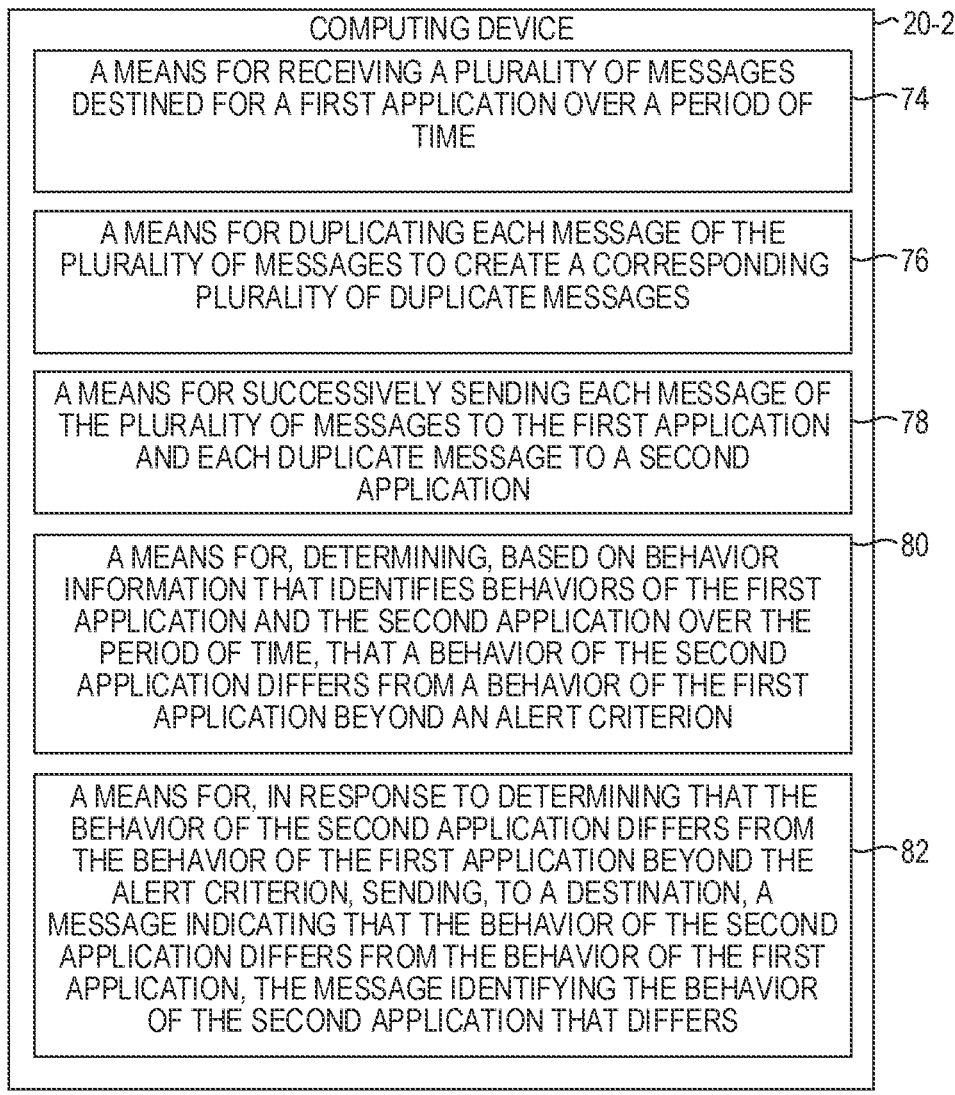
FIG. 9 is a block diagram of a computing device according to additional implementations.

FIG. 9 is a block diagram of a computing device 20-2 according to additional implementations. The computing device 20-2 implements identical functionality as that described above with regard to the computing device 20. In this implementation, the computing device 20 includes a means 74 for receiving a plurality of messages destined for a first application over a period of time. The means 74 may be implemented in any number of manners, including, for example, via the message receiver 64 illustrated in FIG. 8.

The computing device 20 also includes a means 76 for duplicating each message of the plurality of messages to create a corresponding plurality of duplicate messages. The means 76 may be implemented in any number of manners, including, for example, via the message duplicator 66 illustrated in FIG. 8.

The computing device 20 also includes a means 78 for successively sending each message of the plurality of messages to the first application and each duplicate message to a second application. The means 78 may be implemented in any number of manners, including, for example, via the message sender 68 illustrated in FIG. 8.

The computing device 20 also includes a means 80 for determining, based on behavior information that identifies behaviors of the first application and the second application over the period of time, that a behavior of the second application differs from a behavior of the first application beyond an alert criterion. The means 80 may be implemented in any number of manners, including, for example, via the behavior difference determiner 70 illustrated in FIG. 8.

The computing device 20 also includes a means 82 means for, in response to determining that the behavior of the second application differs from the behavior of the first application beyond the alert criterion, sending, to a destination, a message indicating that the behavior of the second application differs from the behavior of the first application, the message identifying the behavior of the second application that differs. The means 82 may be implemented in any number of manners, including, for example, via the message sender 72 illustrated in FIG. 8.

Figure 10:
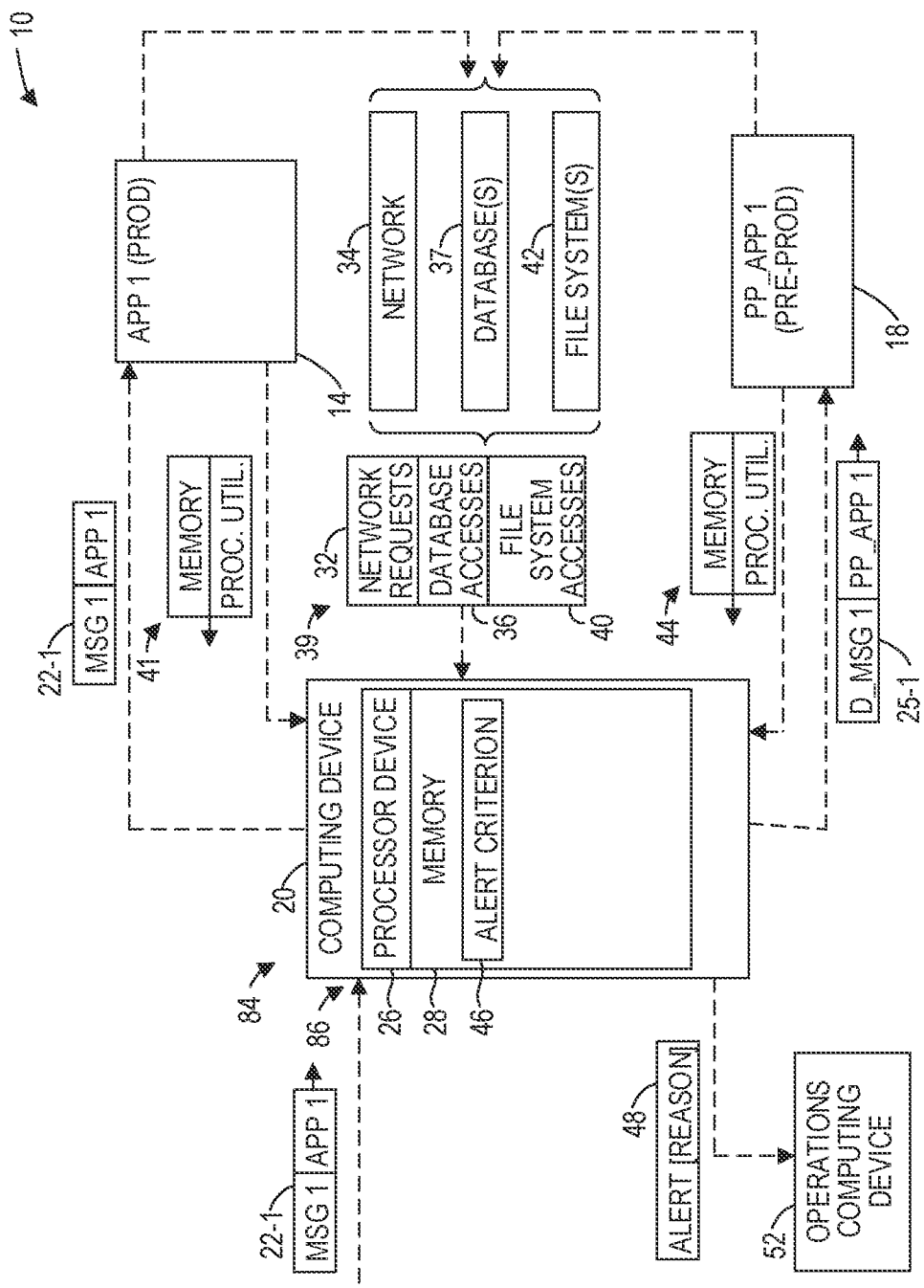
FIG. 10 is a simplified block diagram of the environment illustrated in FIG. 1 according to one implementation.

FIG. 10 is a simplified block diagram of the environment 10 illustrated in FIG. 1 according to one implementation. The environment 10 includes a computer system 84 that includes a processor device set 86 comprising one or more processor devices 26 of one or more computing devices 20. The processor device set 86 is to receive the message 22-1 destined for the production application 14 (sometimes referred to herein as the first application). The processor device set 86 is further to duplicate the message 22-1 to create the duplicate message 25-1. The processor device set 86 is further to send the message 22-1 to the production application 14 and the duplicate message 25-1 to the pre-production application 18. The processor device set 86 is further to determine, based on the behavior information 39 that identifies behaviors of the production application 14 and the pre-production application 18 (sometimes referred to herein as the second application) in response to the message 22-1 and the duplicate message 25-1, that a behavior of the pre-production application 18 differs from a behavior of the production application 14 beyond the alert criterion 46. The processor device set 86 is further to, in response to determining that the behavior of the pre-production application 18 differs from the behavior of the production application 14 beyond the alert criterion 46, send, to a destination, the alert 48 indicating that the behavior of the pre-production application 18 differs from the production application 14, the alert 48 identifying the behavior that differs.

Figure 11:
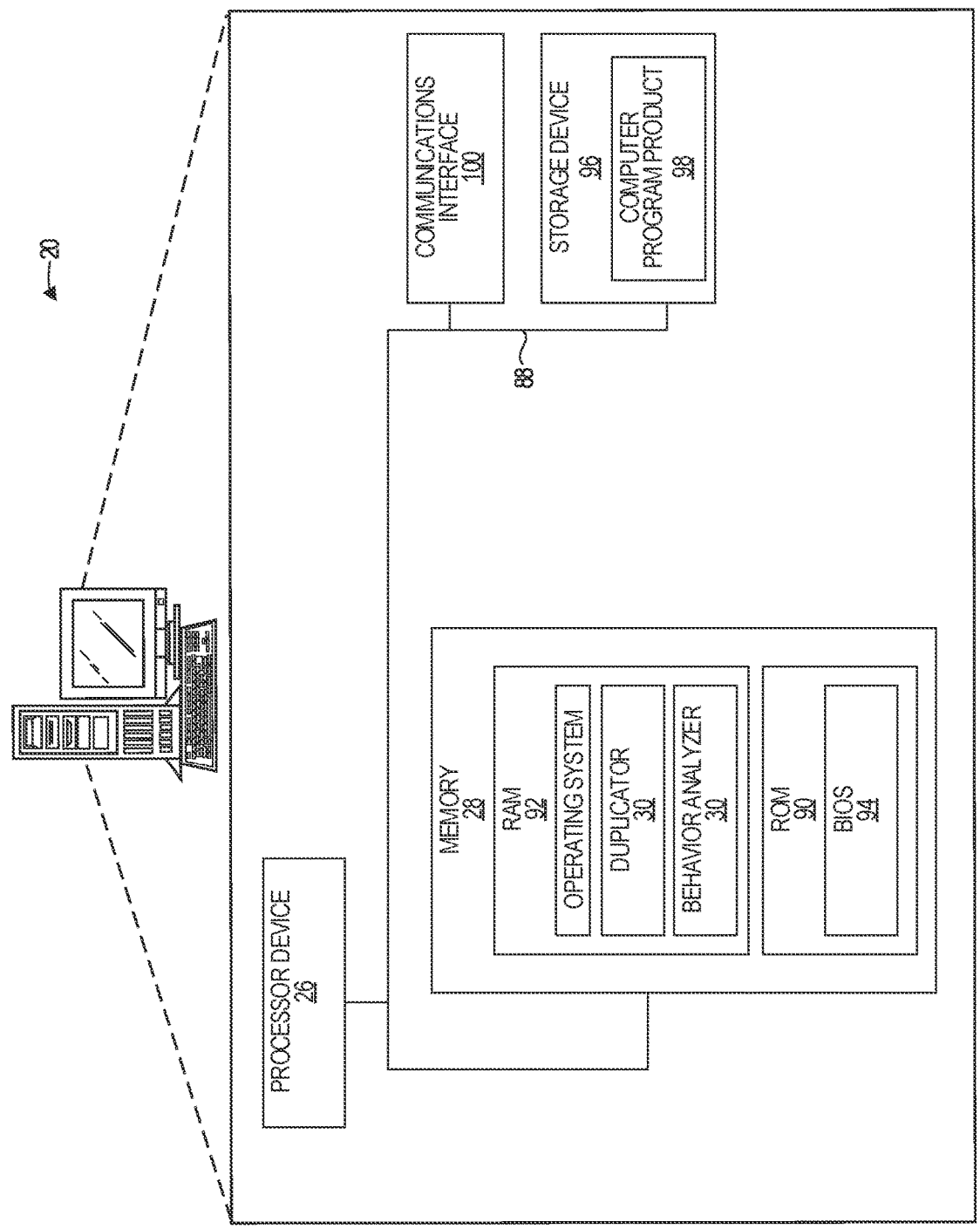
FIG. 11 is a block diagram of the computing device suitable for implementing examples according to one example.

FIG. 11 is a block diagram of the computing device 20 suitable for implementing examples according to one example. The computing device 20 may comprise any computing or electronic device capable of including firmware, hardware, and/or executing software instructions to implement the functionality described herein, such as a computer server, a desktop computing device, a laptop computing device, or the like. The computing device 20 includes the processor device 26, the system memory 28, and a system bus 88. The system bus 88 provides an interface for system components including, but not limited to, the system memory 28 and the processor device 26. The processor device 26 can be any commercially available or proprietary processor.

The system bus 88 may be any of several types of bus structures that may further interconnect to a memory bus (with or without a memory controller), a peripheral bus, and/or a local bus using any of a variety of commercially available bus architectures. The system memory 28 may include non-volatile memory 90 (e.g., read-only memory (ROM), erasable programmable read-only memory (EPROM), electrically erasable programmable read-only memory (EEPROM), etc.), and volatile memory 92 (e.g., random-access memory (RAM)). A basic input/output system (BIOS) 94 may be stored in the non-volatile memory 90 and can include the basic routines that help to transfer information between elements within the computing device 20. The volatile memory 92 may also include a high-speed RAM, such as static RAM, for caching data.

The computing device 20 may further include or be coupled to a non-transitory computer-readable storage medium such as a storage device 96, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 96 and other drives associated with computer-readable media and computer-usable media may provide non-volatile storage of data, data structures, computer-executable instructions, and the like.

A number of modules can be stored in the storage device 96 and in the volatile memory 92, including an operating system and one or more program modules, such as the duplicator 30 and behavior analyzer 38, which may implement the functionality described herein in whole or in part. All or a portion of the examples may be implemented as a computer program product 98 stored on a transitory or non-transitory computer-usable or computer-readable storage medium, such as the storage device 96, which includes complex programming instructions, such as complex computer-readable program code, to cause the processor device 26 to carry out the steps described herein. Thus, the computer-readable program code can comprise software instructions for implementing the functionality of the examples described herein when executed on the processor device 26. The processor device 26, in conjunction with the duplicator 30 and behavior analyzer 38 in the volatile memory 92, may serve as a controller, or control system, for the computing device 20 that is to implement the functionality described herein.

An operator may also be able to enter one or more configuration commands through a keyboard (not illustrated), a pointing device such as a mouse (not illustrated), or a touch-sensitive surface such as a display device. The computing device 20 may also include a communications interface 100 suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a computing device that includes a means for receiving a plurality of messages destined for a first application over a period of time; a means for duplicating each message of the plurality of messages to create a corresponding plurality of duplicate messages; a means for successively sending each message of the plurality of messages to a first application and each duplicate message to a second application; a means for determining, based on behavior information that identifies behaviors of the first application and the second application over the period of time, that a behavior of the second application differs from a behavior of the first application beyond an alert criterion; and a means for, in response to determining that the behavior of the second application differs from the behavior of the first application beyond the alert criterion, sending, to a destination, a message indicating that the behavior of the second application differs from the behavior of the first application, the message identifying the behavior that differs.

Example 2 is the computing device of example 1 wherein the means for determining that the behavior of the second application differs from the behavior of the first application includes means for determining that the second application one of issued a network request not issued by the first application, requested a database connection not requested by the first application, or issued a file system access not issued by the by the first application.

Example 3 is a computing device that includes a message receiver to receive a plurality of messages destined for a first application over a period of time; a message duplicator to duplicate each message of the plurality of messages to create a corresponding plurality of duplicate messages; a message sender to successively send each message of the plurality of messages to a first application and each duplicate message to a second application; a behavior difference determiner to determine, based on behavior information that identifies behaviors of the first application and the second application over the period of time, that a behavior of the second application differs from a behavior of the first application beyond an alert criterion; and a message sender to, in response to determining that the behavior of the second application differs from the behavior of the first application beyond the alert criterion, send, to a destination, a message indicating that the behavior of the second application differs from the behavior of the first application, the message identifying the behavior that differs.

Example 4 is the computing device of example 3 wherein the behavior difference determiner is further to determine that one of a processor utilization or memory utilization of the second application differs from the processor utilization or the memory utilization of the first application while processing a same message.

Example 5 is a method that includes receiving a message destined for a first application; duplicating the message to create a duplicate message; sending the message to a first application and the duplicate message to a second application; determining, based on behavior information that identifies behaviors of the first application and the second application in response to the message and the duplicate message, that a behavior of the second application differs from a behavior of the first application beyond an alert criterion; and in response to determining that the behavior of the second application differs from the behavior of the first application beyond the alert criterion, sending, to a destination, a message indicating that the behavior of the second application differs from the first application, the message identifying the behavior that differs.

Example 6 is the method of example 5 wherein determining that the behavior of the second application differs from the behavior of the first application beyond the alert criterion includes determining that the second application issued a different number of reads or writes to a file system in response to the second application receiving a duplicate message than a number of reads or writes to the file system issued by the first application in response to receiving the corresponding message.

Example 7 is a method including iteratively: obtaining behavior information that identifies behaviors of a first application and a second application in response to the receipt of a same message, the second application being a revised version of the first application; determining that the second application had a different behavior than the first application in response to the same message; determining that the different behavior is permissible or impermissible; and training a machine learning model with information that identifies the different behavior and whether the different behavior is permissible or impermissible.

Example 8 is the method of example 7 further including, subsequent to training the machine learning model, receiving a message destined for a third application, the third application being a revised version of the first application; duplicating the message to create a corresponding duplicate message; sending the message to the third application and the duplicate message to a fourth application, the fourth application being a revised version of the third application; obtaining behavior information that identifies behaviors of the third application and the fourth application in response to the message and the duplicate message; determining that the fourth application had a different behavior than the third application; inputting the information that identifies the different behavior into the machine learning model; determining whether the different behavior differs beyond an alert criterion based on an output of the machine learning model.

Example 9 is the method of example 8 wherein the different behavior includes one or more of issuing a greater number of database accesses than issued by the third application, issuing a greater number of database delete accesses than issued by the third application, issuing a greater number of database read accesses than issued by the third application, connecting to a different database than connected to by the third application, and issuing a different number of database connections than issued by the third application.

Example 10 is the method of example 8 wherein the different behavior includes one or more of issuing a network request to an IP address or domain name not accessed by the third application, issuing a network request to a particular IP address without making a DNS request to obtain the IP address, issuing a greater number of network requests than issued by the third application, issuing a network request to a server in a geographic region not accessed by the third application, issuing a network request to a server in a predetermined geographic region not accessed by the third application, issuing a network request that was not issued by the third application, and issuing a network request that is a connection to a server that is not issued by the third application.

Example 11 is the method of example 8 wherein the different behavior includes one or more of attempting to access a file not accessed by the third application, issuing more file system read or write accesses than issued by the third application, generating a file in a file system that was not generated by the third application, and deleting a file in a file system that was not deleted by the third application.

Example 12 is a computing device that includes a memory and a processor device coupled to the memory to iteratively: obtain behavior information that identifies behaviors of a first application and a second application in response to the receipt of a same message, the second application being a revised version of the first application; determine that the second application had a different behavior than the first application in response to the same message; determine that the different behavior is permissible or impermissible; and train a machine learning model with information that identifies the different behavior and whether the different behavior is permissible or impermissible.

Example 13 is the computing device of example 12 wherein the different behavior includes one or more of issuing a greater number of database accesses than issued by the third application, issuing a greater number of database delete accesses than issued by the third application, issuing a greater number of database read accesses than issued by the third application, connecting to a different database than connected to by the third application, and issuing a different number of database connections than issued by the third application.

Example 14 is the computing device of example 12 wherein the different behavior includes one or more of issuing a network request to an IP address or domain name not accessed by the third application, issuing a network request to a particular IP address without making a DNS request to obtain the IP address, issuing a greater number of network requests than issued by the third application, issuing a network request to a server in a geographic region not accessed by the third application, issuing a network request to a server in a predetermined geographic region not accessed by the third application, issuing a network request that was not issued by the third application, and issuing a network request that is a connection to a server that is not issued by the third application.

Example 15 is the computing device of example 12 wherein the different behavior includes one or more of attempting to access a file not accessed by the third application, issuing more file system read or write accesses than issued by the third application, generating a file in a file system that was not generated by the third application, and deleting a file in a file system that was not deleted by the third application.

Individuals will recognize improvements and modifications to the preferred examples of the disclosure. All such improvements and modifications are considered within the scope of the concepts disclosed herein and the claims that follow.

What is claimed is:

1. A method comprising:
   receiving a plurality of messages destined for a first application over a period of time, the first application comprising a production application executing on a first computing device;
   duplicating each message of the plurality of messages to create a corresponding plurality of duplicate messages;
   successively sending each message of the plurality of messages to the first application and each duplicate message to a second application, the second application comprising a pre-production application corresponding to the production application and executing on a second computing device, wherein the pre-production application is a different version of the production application and implements new functionality not implemented in the production application;
   determining, based on behavior information that identifies behaviors exhibited by the first application in response to receiving the plurality of messages and behaviors exhibited by the second application in response to receiving the plurality of duplicate messages over the period of time, that a behavior of the second application differs from a behavior of the first application beyond an alert criterion; and
   in response to determining that the behavior of the second application differs from the behavior of the first application beyond the alert criterion, sending, to a destination, a message indicating that the behavior of the second application differs from the behavior of the first application, the message identifying the behavior of the second application that differs from the behavior of the first application.

2. The method of claim 1 wherein determining that the behavior of the second application differs from the behavior of the first application beyond the alert criterion comprises determining that the second application issued at least one network request in response to receiving a duplicate message that was not issued by the first application in response to the first application receiving a message that corresponds to the duplicate message.

3. The method of claim 1 wherein determining that the behavior of the second application differs from the behavior of the first application beyond the alert criterion comprises determining that the second application issued a network request directed to a particular internet protocol address without making a domain name system (DNS) request prior to issuing the network request in response to the second application receiving a duplicate message and the first application not issuing a network request directed to the particular internet protocol address in response to receiving a message that corresponds to the duplicate message.

4. The method of claim 1 wherein determining that the behavior of the second application differs from the behavior of the first application beyond the alert criterion comprises determining that the second application has connected to at least one server to which the first application has not connected.

5. The method of claim 1 wherein determining that the behavior of the second application differs from the behavior of the first application beyond the alert criterion comprises determining that the second application issued a network request directed to a server located in a particular geographic region in response to the second application receiving a duplicate message and the first application not issuing a network request directed to the server located in the particular geographic region in response to receiving a message that corresponds to the duplicate message.

6. The method of claim 1 wherein determining that the behavior of the second application differs from the behavior of the first application beyond the alert criterion comprises determining that the second application issued a different number of database connections in response to the second application receiving a duplicate message than a number of database connections made by the first application in response to receiving a message that corresponds to the duplicate message.

7. The method of claim 1 wherein determining that the behavior of the second application differs from the behavior of the first application beyond the alert criterion comprises determining that the second application issued a connection to a different database in response to the second application receiving a duplicate message than a database to which the first application issued a connection in response to receiving a message that corresponds to the duplicate message.

8. The method of claim 1 wherein determining that the behavior of the second application differs from the behavior of the first application beyond the alert criterion comprises determining that the second application issued a different number of reads or writes to a file system in response to the second application receiving a duplicate message than a number of reads or writes to the file system issued by the first application in response to receiving a message that corresponds to the duplicate message.

9. The method of claim 1 wherein determining that the behavior of the second application differs from the behavior of the first application beyond the alert criterion comprises determining that the second application issued a read or write to a different file in response to the second application receiving a duplicate message than a file to which the first application issued a read or write in response to receiving a corresponding message.

10. The method of claim 1 wherein determining that the behavior of the second application differs from the behavior of the first application beyond the alert criterion comprises determining that the second application used a longer period of processor time in response to the second application receiving a duplicate message than a period of processor time used by the first application in response to receiving a message that corresponds to the duplicate message.

11. The method of claim 1 wherein determining that the behavior of the second application differs from the behavior of the first application beyond the alert criterion comprises determining that the second application utilizes a greater amount of memory than an amount of memory utilized by the first application.

12. The method of claim 1 wherein determining that the behavior of the second application differs from the behavior of the first application beyond the alert criterion further comprises:
inputting a differing behavior of the second application from the first application into a machine learning model; and
receiving, from the machine learning model, an output that indicates that the differing behavior is beyond the alert criterion.

13. The method of claim 1 further comprising:
prior to sending a message of the plurality of messages to the first application and a duplicate message of the plurality of duplicate messages to the second application, installing the second application in a duplicate environment that is a copy of a production environment in which the first application operates.

14. The method of claim 1 further comprising intercepting network requests, attempted database connections and attempted file system reads or writes initiated by the second application.

15. A computer system comprising:
a processor device set comprising one or more processor devices of one or more computing devices, the processor device set to:
receive a plurality of messages destined for a first application over a period of time, the first application comprising a production application executing on a first computing device;
duplicate each message of the plurality of messages to create a corresponding plurality of duplicate messages;
successively send each message of the plurality of messages to the first application and each duplicate message to a second application, the second application comprising a pre-production application corresponding to the production application and executing on a second computing device, wherein the pre-production application is a different version of the production application and implements new functionality not implemented in the production application;
determine, based on behavior information that identifies behaviors exhibited by the first application in response to receiving the plurality of messages and behaviors exhibited by the second application in response to receiving the plurality of duplicate messages over the period of time, that a behavior of the second application differs from a behavior of the first application beyond an alert criterion; and in response to determining that the behavior of the second application differs from the behavior of the first application beyond the alert criterion, send, to a destination, a message indicating that the behavior of the second application differs from the behavior of the first application, the message identifying the behavior of the second application that differs from the behavior of the first application.

16. The computer system of claim 15 wherein to determine that the behavior of the second application differs from the behavior of the first application beyond the alert criterion, the processor device set is further to determine that the second application issued a network request directed to a particular internet protocol address without making a domain name system (DNS) request prior to issuing the network request in response to the second application receiving a duplicate message and the first application not issuing a network request directed to the particular internet protocol address in response to receiving a message that corresponds to the duplicate message.

17. The computer system of claim 15 wherein to determine that the behavior of the second application differs from the behavior of the first application beyond the alert criterion, the processor device set is further to determine that the second application used a longer period of processor time in response to the second application receiving a duplicate message than a period of processor time used by the first application in response to receiving a message that corresponds to the duplicate message.

18. A non-transitory computer-readable storage medium that includes executable instructions configured to cause a processor device set comprising one or more processor devices to:
receive a plurality of messages destined for a first application over a period of time, the first application comprising a production application executing on a first computing device;
duplicate each message of the plurality of messages to create a corresponding plurality of duplicate messages, wherein each duplicate message corresponds to one of the plurality of messages;
successively send each message of the plurality of messages to the first application and each duplicate message to a second application, the second application comprising a pre-production application corresponding to the production application and executing on a second computing device, wherein the pre-production application is a different version of the production application and implements new functionality not implemented in the production application;
determine, based on behavior information that identifies behaviors exhibited by the first application in response to receiving the plurality of messages and behaviors exhibited by the second application in response to receiving the plurality of duplicate messages over the period of time, that a behavior of the second application differs from a behavior of the first application beyond an alert criterion; and
in response to determining that the behavior of the second application differs from the behavior of the first application beyond the alert criterion, send, to a destination, a message indicating that the behavior of the second application differs from the behavior of the first application, the message identifying the behavior of the second application that differs from the behavior of the first application.

19. The non-transitory computer-readable storage medium of claim 18 wherein to determine that the behavior of the second application differs from the behavior of the first application beyond the alert criterion, the instructions further cause the processor device set to:
input a differing behavior of the second application from the first application into a machine learning model; and
receive, from the machine learning model, an output that indicates that the differing behavior is beyond the alert criterion.

20. The non-transitory computer-readable storage medium of claim 18 wherein to determine that the behavior of the second application differs from the behavior of the first application beyond the alert criterion, the instructions further cause the processor device set to determine that the second application has connected to at least one server to which the first application has not connected.

* * * * *